Oct. 31, 1967   G. DE COYE DE CASTELET   3,349,878
CONTROL OF THE POWER OF THE ENGINE OF A VEHICLE WITH
AN AUTOMATIC GEAR-BOX AND AN ELECTRICALLY-OPERATED
CLUTCH
Filed March 29, 1965
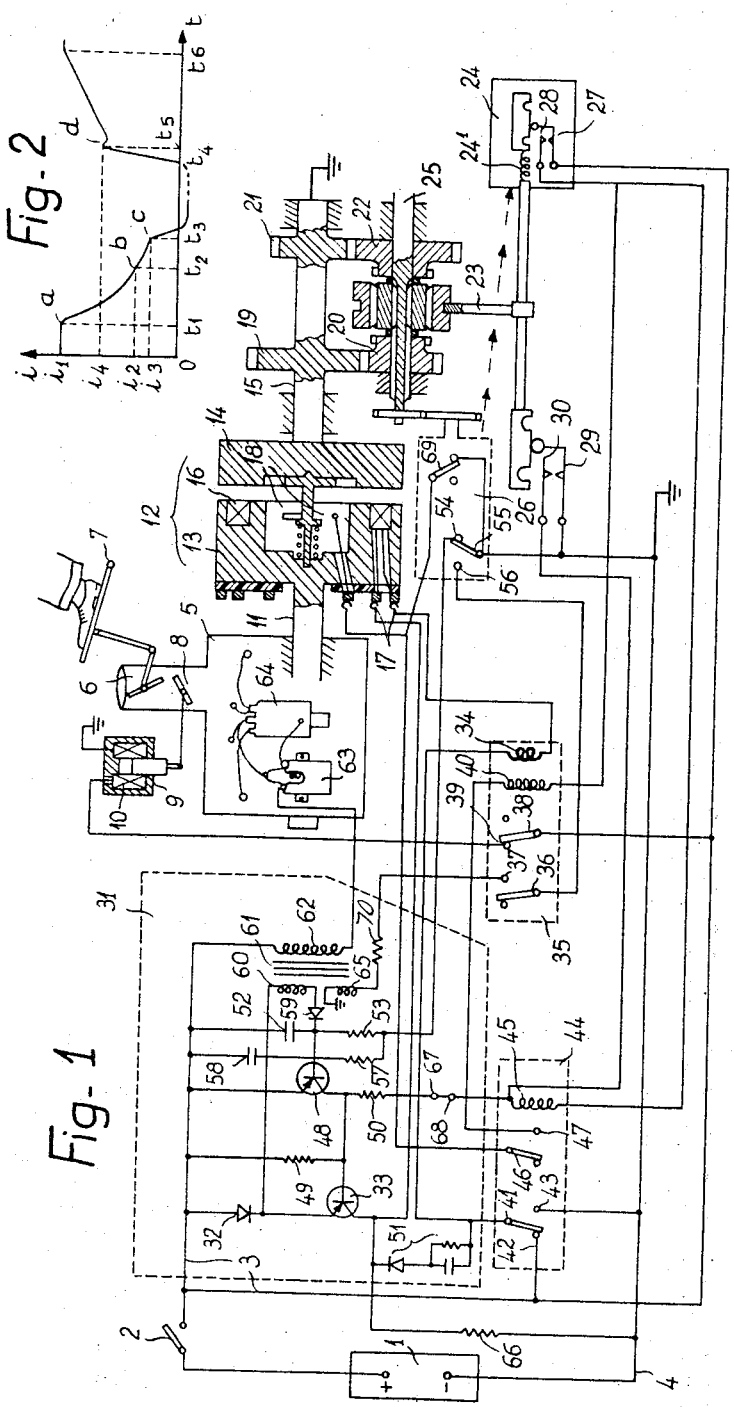
Inventor
Gäetan De Coye DeCastelet
By Stevens, Davis, Miller & Mosher
Attorneys

United States Patent Office 3,349,878
Patented Oct. 31, 1967

3,349,878
CONTROL OF THE POWER OF THE ENGINE OF A VEHICLE WITH AN AUTOMATIC GEAR-BOX AND AN ELECTRICALLY-OPERATED CLUTCH
Gaëtan de Coye de Castelet, Billancourt, France, assignor to Regie Nationale des Usines Renault, Billancourt, France
Filed Mar. 29, 1965, Ser. No. 443,194
Claims priority, application France, Apr. 2, 1964, 969,520, Patent 1,398,895
10 Claims. (Cl. 192—.092)

ABSTRACT OF THE DISCLOSURE

A device for controlling the power of the engine of a vehicle having an automatic gear box and an electrically operated clutch with interruption of the torque during gear changes. The device controlling the engine power in dependence on the valve of the clutch operating current during changes of gear ratio and rendering the control current dependent on the speed of the engine during reengagement of the clutch.

---

The present invention has for its object an improvement in automatic transmissions with electrically operated clutches and gear ratios in steps with interruption of the torque during changes of gear. In known systems, the de-clutching order and the order for partial stoppage of admission of the gas to the engine are generally given simultaneously at the beginning of the changes of gear, the de-clutching being effected by rapid interruption of the operating current of the clutch. Although these orders are simultaneous, their execution is however often somewhat erratic, especially with electro-magnetic controls, which gives an unpleasant variable effect while driving.

On the other hand, after engagement of the new transmission ratio, the orders for re-engagement and re-admission of the gas are again simultaneous, and as electrically-operated clutches have time constants for the establishment of the current, which are of the order of 0.1 to 0.4 second for the usual types of passenger vehicles, this results in a delay of the current and therefore of the torque transmissible by the clutch with respect to the engine torque. Phenomena of mechanical delays are also added to the electrical delay. The overall delay results in an undesirable increase in speed of the engine during the period of slip of the clutch which is thus prolonged and results in a greater thermal fatigue of the clutch.

The present invention provides a particular remedy for these defects by the use of a device responsive to the intensity of the control current of the clutch, intended to interrupt partly and to restore the output of power required from the engine for pre-determined values of the current intensity during changes of ratio in the transmission.

There is thus obtained, on the one hand an improvement in de-clutching operations, since the engine remains accelerated as long as the control current of the clutch has not fallen below the regulated values, the interruption of the current being in fact never instantaneous, and on the other hand, an improvement of the clutch re-engagement during changes to a higher gear, since the beginning of the re-engagement is effected with the engine having little or no acceleration, which results in a smoother engagement and less fatigue of the clutch components.

The invention is furthermore characterized by other preferred auxiliary arrangements for carrying it into effect, as will be summarized below.

A first arrangement consists of permitting the delivery of the power required from the engine, before the corresponding value of the increasing current is reached, during starting of the vehicle and during changes to a lower gear which require an engine speed increase.

A second arrangement consists, after changing gears, of feeding the current into the clutch at a higher rate before than after the regulated current intensity is reached, with the object of obtaining rapid engagement of the clutch.

A third arrangement consists, during declutching, of progressively interrupting the current to the clutch, at least at the beginning of the operation, in order to improve still further the effect made on the driver during changes of gear.

The invention will now be described with reference to the non-limitative example of one form of embodiment shown in the accompanying drawings, in which:

FIG. 1 is the mechanical and electrical schematic diagram of a control in accordance with the invention;

FIG. 2 is a graphic representation, as a function of time, of the variation or the current in the clutch during changing to a higher gear ratio, in the case of progressive interruption of current when disengaging the clutch by means of the control shown in FIG. 1.

In FIG. 1, the battery installed in the vehicle is shown at 1. Its positive pole supplies a positive distribution line 3 through the ignition switch 2, while its negative pole supplies the negative line 4 which is connected to the general ground of the vehicle.

The admission of gas to the engine 5 is controlled by a main butterfly-valve 6, coupled to the accelerator pedal 7. An auxiliary butterfly-valve 8 permits the admission passage of the gas to be partly closed. Its closure is controlled by the action of the core of an electro-magnet 9, the coil of which is shown at 10.

The output shaft 11 of the engine carries the driving member 13 of an electro-magnetic clutch 12, of known type, the driven member 14 of which is coupled to the input shaft 15 of the gear-box. The coil 16 of the clutch is supplied by brushes and collector rings 17. A synchronism contact 18 between the driving and driven members of the clutch, is closed when the speed of the driving member 13 is less than the speed of the driven member 14. This contact is also connected to a corresponding output brush on the clutch.

For the sake of simplicity, the gear-box has been shown merely as a two-speed box with parallel shafts and pairs of the pinions 19–20 and 21–22 which can be engaged in known manner by means of the fork 23, the movement of which is controlled by a mechanism 24, which is for example an electric motor. The output shaft 25 of the gear box is connected to the wheels of the vehicle.

The mechanism 24 is controlled by a governor 26, of known type and responsible for changes of speed, the latter being responsive to the speed of rotation of the shaft 25. When the mechanism 24 has completed its travel, with the spring 24¹ being compressed or under tension, the blade 27 touches the fixed contact 28. The effective movements of the fork, corresponding to the engagement of the pairs of pinions 19–20 or 21–22, are detected by the contact blade 29 which touches the fixed contact 30 at the limits of travel of the fork.

The supply to the coil 16 of the clutch is effected as a function of the speed of the engine 5 for starting, and as a function of the speed of the engine and of time counted from the engagement of the forks for the changes of gear during running, by an electronic supply device 31 of the transistor type which is known and of which only the parts which are necessary for the comprehension have been shown in the drawing.

Starting from the positive line 3 there are arranged in series a diode 32 in the conducting direction and a power transistor PNP 33, in the collector circuit of which are mounted in series the coil 16 of the clutch and the current coil 34 of heavy wire (shown in thick lines) of a relay 35, the connections and method of operation of which are characteristic features of the present invention.

This relay 35 has two separate blades 36 and 38, the first having a working contact 37 and the second a rest contact 39. This relay 35 can also be put into operation by a voltage coil 40 of fine wire.

The coil 34 is connected to the blade 41 of a relay 44, the excitation coil of which is shown at 45. The blade 41 at rest touches the contact 42 connected to the positive line 3 and at work touches the contact 43 connected to the ground line 4. The transistor 33 is protected against excess voltage by a circuit 51 of known type, arranged between its collector and the blade 41. A de-magnetizing resistance 66 for the clutch coil 16 is mounted between the collector of the transistor 33 and the ground line 4.

The relay 44 has a second blade 46 with a working contact 47. The base of the transistor 33 is connected to contact 47. The base of the transistor 33 is connected to the collector of the transistor PNP 48, to the positive line 3 by a leakage resistance 49, and to the ground line 4 through a resistance 50, the coupling 67–68 and the end-of-travel contact 29–30 of the fork of the gear-box. The function of this coupling 67–68 will be seen later for an alternative form of embodiment with abrupt interruption during uncoupling.

The base of the transistor 48 is connected to a condenser 52, the other plate of which is connected to the line 3, and by a resistance 53 to the contact 54 of the governor 26, this contact 54 being connected to the ground line 4 by the blade 55 at low vehicle speeds, for example below 18 km. per hour, and also during changes of gear.

To this contact 54 is also connected a resistance 57 in series with a reservoir condenser 58, the other plate of which is connected to the positive line 3. The blade 55 touches the contact 56 when it does not touch 54.

Through the diode 59 and the secondary 60 of a transformer 61, the primary 62 of which is in series with the ignition coil 63 of the engine, the condenser 52 receives charging pulses at each opening of the distributor 64. These charging waves block the transistor 48 and render the transistor 33 conductive for a pre-determined time thereby obtaining, in the coil 16 of the clutch, a current which is a function of the engine speed when the contact 54–55 is closed, at low speed when starting, and a function of the engine speed and the time starting from the opening of the contact 54–55 by the "reservoir" effect of the condenser 58.

The transformer 61 has at least one auxiliary winding 65, connected on one side to ground and on the other to the contact 37 through a resistance 70. By the action of the contacts 36–37 and 55–56. This winding enables the rate of supply to the clutch to be modified during the re-couplings which follow a change of gear.

The auxiliary coil 40, of fine wire, of the current relay 35 produces a flux in the same direction as the coil 34, of heavy wire, when the relay 44 is in the working position, that is to say with a gear engaged and the gearbox fork at the limit of its travel. This coil 40 of the relay 35 is connected on one side to the positive line 3 through the end-of-travel contacts 27–28 of the mechanism 24, and on the other to the ground line through the working contact 46–47 of the relay 44 and the contact 69 of the governor 26 and/or the synchronism contact 18, which is grounded when the driving member 13 rotates at a speed less than the driven member 14, in the case of utilization of the vehicle with the engine braking.

The contact 69 of the governor is closed when the vehicle must remain or be put into the first gear ratio 21–22. When so desired it may be coincident with the contact 54–55 which is closed at low vehicle speeds.

The operation of the device will now be described, taking account in particular of the fact that the control of the gear-box forks and the electronic supply of the clutch are known and that the apparatus shown in FIG. 1 is shown in an intermediate position between gears.

When starting the vehicle, the low gear ratio 21–22 being engaged, the contacts 69 and 54–55 are closed. This is also the case for the end-of-travel contacts 27–28 of the mechanism 24 and the end-of-travel contacts 29–30 of the gear-box fork.

The relay 44 is in the working position, and the coil 40 of the relay 35 is excited by the battery through the contacts 27–28, 46–47 and 69. The relay 35 is therefore at work, that is to say the coil 10 of the electromagnet 9 has not been excited and the auxiliary butterfly-valve 8 is open, leaving complete freedom of control to the main butterfly-valve 6.

The winding 16 of the clutch is supplied by the electronic device 31 through the contacts 41–43. The contacts 36–37 are closed, but on the other hand the contact 55–56 is not grounded, that is to say the rate of supply to the clutch as a function of the speed of the engine is the steep slope which is suitable when starting.

After engaging the clutch and starting, at speeds towards 18 km. per hour, the contact 54–55 opens while the contact 55–56 closes, which reduces the rate of supply to the clutch while making it a function of the time, but the transient phenomenon can be neglected since in any case the maximum current has already been reached (furthermore, nothing prevents the contact 54–55 from receiving a differential memory, following a known method, by coupling its movement with that of the contact 69). Starting from this moment, the relay 35 is only kept in the working position by its heavy wire coil 34.

In order to change to the higher ratio 19–20, when determined by the governor 26, the opening of the contact 69 is opened and the mechanism 24 started, breaking the contact 27–28 bringing the relay 44 to rest, the blade 41 coming on to the rest contact 42 which forms a closed loop comprising the coils 16 and 34, the diode 32 and the transistor 33. The transistor 48 being almost blocked in consequence of the speed of the engine, the resistance 50 continues to polarize the base of the transistor 33, making it conductive until the gear-box fork end-of-travel contacts 29–30 open.

The shape of the current decay curve in the clutch coil 16 is shown in FIG. 2 with the time $t$ as the abscissa and the current $i$ as the ordinate. At the time $t_1$, the point $a$ of opening of the contacts 27–28, the current $i_1$ diminishes in an approximately exponential manner; at the time $t_2$, the point $b$, the current $i_2$ is no longer sufficient to hold the relay 35 in the working position by its coil 34, and the coil 10 of the electromagnet 9 is then excited through the contacts 38–39, that is to say the butterfly-valve 8 closes and cuts-off the admission of gas. At the time $t_3$, point $c$, $i_3$, the contacts 29–30 at the end-of-travel of the gearbox fork open, the polarization circuit of the base of the transistor 33 is broken and the clutch is then deenergized or uncoupled. The cutting-off of the gas is thus associated with the current in the clutch.

During changing of gears, the closure of the contacts 54–55 "re-sets" the time-delay, by permitting the recharge of the condenser 58.

Upon engagement of the higher gear 19–20, the contact 27–28 closes first, followed by the contact 29–30, the blade 55 returning to the contact 56, and the relay 44 going back to the working position while the relay 35 remains at rest, the contacts 18 and 69 being open.

As long as the regulation current of the relay 35 for increasing current is not reached, the butterfly-valve 8 will remain closed and the reengagement of the clutch will be effected with a low power of the engine. The contact 36–37 being open, the re-engagement will take place following a steep current curve as can be seen from FIG. 2, between $t_4$ and $t_5$.

When the regulation current for current increase, $i_4$, point $d$, instant $t_5$ is reached, the relay 35 returns to the working position, the coil 10 is de-energized, opening the butterfly-valve 8, while the contact 36–37 closes, reducing the rate of supply to the clutch as a function of the speed of the engine. Irrespective of the speed of the engine, the time-delay causes the current to reach its maximum value at the instant $t_6$, the distance of which with respect to the instant $t_5$, reduces when the speed of the engine 5 increases, since every charge made to the condenser 52 discharges the condenser 58.

The adjustments of the relay 35, for example with increasing current in the coil 34, will be comprised between 0.5 and 1 times the value of the current in the clutch which balances the engine torque, and with decreasing current it will be comprised between 0.8 and 0.1 times, these values not being limitative.

This method has a certain number of advantages, in particular it permits coupling to be made with a slightly increasing current beyond the instant $t_5$, the value $i_4$ remaining constant, irrespective of the temperature rise of the clutch which increases the ohmic resistance of the coil 6, the period between $t_4$ and $t_5$ being simply slightly prolonged. The changes to a higher gear appear to be rapid, the engine noise is reduced, and with regard to the smoothness of de-clutching, this is extraordinarily improved by the good synchronism of operations and the reduction of the derivative of the acceleration of the vehicle.

During changes to the lower gear ratio 21–22, the contact 18 is closed since the driven member 14 of the clutch rotates faster than the driving member 13. As soon as the gear is engaged, the contacts 27–28, 29–30, 46–47 and 18 being closed, the coil 40 is energized; contacts 38–39 are opened; and coil 10 is energized so that readmission of the gas takes place practically with the end of travel of the gear box fork. However, the rate of supply of the clutch as a function of the engine speed is reduced since the contact 36–37 is closed to shunt the winding 65 by the resistance 70.

As an alternative form, the interruption of the current in the coil 16 may be made more rapid during de-clutching by breaking the connection 67–68 and coupling the resistance 50 to the blade 41 which touches the contact 42, connected to the positive line 3 in the rest position of the relay 44, blocking the transistor 33 at the beginning of the de-clutching operation.

In the construction shown, use is made of a current relay to control the power delivery by the engine, but a control of this kind can of course be also obtained by means of known circuits responsive to current and utilizing electronic elements such as transistors, diodes, tunnel diodes, Zener diodes, solid thyratrons, etc. without departing from the scope of the invention.

In addition, instead of controlling the auxiliary admission butterfly 8, the current relay could, without departing from the scope of the invention, control other known devices acting on the power of the engine, and in particular the variation of advance of the ignition in accordance with Patent Application No. 349,940 of present applicant filed on Mar. 6, 1964, with the title: "A method and apparatus for obtaining by variation of advance the deceleration of the engine of an automobile vehicle provided with an automatic gearbox."

The invention is of course applicable to the case of electric drives acting on other types of clutches instead of electric.

What is claimed is:

1. A device for controlling the power of the engine of a vehicle having an automatic gear-box with stepped gear ratios and an electrically operated clutch which interrupts torque during gear changes comprising means for controlling the power output of the engine in dependence upon the value of the operating current of said clutch, and for rendering said control current dependent on the engine speed during re-engagement of said clutch, means for actuating said control means during gear changes.

2. A device according to claim 1 in which said control means comprises a current relay having a heavy wire coil serially connected to said clutch and through which said clutch control current passes.

3. A device according to claim 2 in which said relay further comprises a fine wire auxiliary coil and means responsive to low vehicle speeds to energize said auxiliary coil at such speeds.

4. A device according to claim 3 further comprising means responsive to a difference in rotational speeds of the driving and driven members of said clutch for energizing said auxiliary coil when the speed of the driving member is less than the speed of the driven member.

5. A device according to claim 3 further comprising means to energize said auxiliary winding after engagement of the selected gear ratio.

6. A device according to claim 2 in which said relay further comprises contacts operatively connected to control the power of the engine and rate of supply of the current to the clutch as a function of the speed of the engine.

7. A device for controlling the change of speed of an automatic transmission of an automotive vehicle in which said vehicle comprises an engine, throttle means for controlling fuel flow to said engine, a transmission including a means for selecting various gear ratios, and an electrically operated clutch having a driving member connected to said engine and a driven member connected to said transmission, means for sensing the speed of the vehicle, said device comprising an electrical supply means operatively connected to control said throttle means as a function of the control current of the clutch and to control said clutch means as a function of the speed of said vehicle, means responsive to said speed sensing means and being operatively connected to actuate said electrical supply means as a function of engine speed.

8. A device for controlling the change of speed of an automatic transmission of an automotive vehicle in which said vehicle comprises an engine, throttle means for controlling fuel flow to said engine, a transmission including a means for selecting various gear ratios, and an electrically operated clutch having a driving member connected to said engine and a driven member connected to said transmission, means for sensing the speed of the vehicle, said device comprising an electrical supply means operatively connected to control said throttle means and said clutch means as a function of the speed of said vehicle, means responsive to said speed sensing means and being operatively connected to actuate said electrical supply means comprising first and second relays, said first relay having a first current coil of heavy gauge wire and a second current coil of light gauge wire, means for energizing said second coil at low vehicle speeds, further means for energizing said second coil when the speed of the driving member is less than said driven member, means responsive to the completion of a gear change for energizing said second coil, and means for energizing said first current coil as a function of the engine speed, whereby upon the passage between gear ratios said clutch is disengaged, said throttle means actuated to retard said engine and, when said transmission is sufficiently re-engaged, said clutch re-engaged and said engine accelerated.

9. A device for controlling the change of speed of an automatic transmission of an automotive vehicle having an engine comprising a transmission having a synchronizing ring, sliding collar, dog and selecton fork, an electrically operated clutch having a driving part connected to the engine and a driven part connected to the transmission and a synchronization detector between the two parts; means responsive to the speed of the vehicle and operatively connected with the transmission to cause gear changes, and electronic circuit means to supply current to said clutch according to engine speed and to control an auxiliary gas inlet valve of the carburetor, said circuit means comprising first and second relays, said first relay having a first coil in series with said clutch, said second relay being connected in series with means indicating the beginning and end of a gear change, a second coil in said first relay the former being energized by said second relay through said synchronization detector.

10. In a vehicle having an engine, a transmission comprising a transmission case, a synchronization ring, a sliding collar, a dog and a selection fork in said case, an electrically operated clutch having a driving part connected to said engine and a driven part connected to said transmission and being adapted to selectively engage and disengage, and a carburetor operatively connected to an accelerator pedal to control the amount of fuel fed to said engine, an auxiliary inlet valve for controlling the fuel fed to said engine, a device for controlling the engine power output during a gear change in dependence upon the clutch operating current comprising an electric control circuit, means responsive to the speed of said vehicle and operatively connected to said electric control circuit, said circuit controlling the actuation of said auxiliary inlet valve and the current flow to said clutch whereby upon changing gear ratios said auxiliary inlet valve closed to throttle said engine and said current flow progressively diminished to effect declutching and whereupon sufficient engagement of said collar and dog is achieved, said auxiliary inlet valve is opened to reaccelerate said engine and said current flow to said clutch is increased to effect re-engagement of the clutch.

References Cited
FOREIGN PATENTS 1,194,714    4/1963    Germany.

FRED C. MATTERN, JR., *Primary Examiner.*

DAVID J. WILLIAMOWSKY, *Examiner.*

C. J. HUSAR, *Assistant Examiner.*